M. A. BOBRICK.
AUXILIARY SEAT BACK.
APPLICATION FILED APR. 28, 1916.

1,222,175.

Patented Apr. 10, 1917.

Inventor
Mayo A. Bobrick

By Obed E. Billman
Attorney

UNITED STATES PATENT OFFICE.

MAYO A. BOBRICK, OF CLEVELAND, OHIO.

AUXILIARY SEAT-BACK.

1,222,175.

Specification of Letters Patent.

Patented Apr. 10, 1917.

Application filed April 28, 1916. Serial No. 94,112.

*To all whom it may concern:*

Be it known that I, MAYO A. BOBRICK, a citizen of the United States, residing at Cleveland, in the county of Cuyahoga and State of Ohio, have invented certain new and useful Improvements in Auxiliary Seat-Backs, of which the following is a specification.

My invention relates to improvements in auxiliary seat-backs, the invention being particularly designed and adapted for use as a supplemental seat-back or "filler brace back" for use in connection with the front or driver's seat of motor vehicles such as automobiles, trucks, and the like, and is designed to fit or fill in the space between the back of the driver or chauffer, where the legs of the latter are so short that it is necessary to be seated somewhat forwardly in the seat in order that the brake and clutch levers may be reached and controlled with the foot.

The primary object of the invention is to provide a generally improved auxiliary or supplemental seat-back of this class which will be exceedingly simple in construction, cheap of manufacture, and efficient in use.

A further object is the provision of an improved spring support or frame for such back, together with an improved cushioned covering for inclosing the same, the improved auxiliary or supplemental back being of such form as to readily fill in the intervening wedge or V-shaped space between the back of the chauffer and the lower portion of the main or stationary seat-back when the chauffer or driver is seated forwardly on the main seat and whereby the back is admirably cushioned and braced to relieve the same from the jars and vibrations of the vehicle.

With the above and other ends in view, the invention consists in the novel construction, arrangement, and combination of parts, hereinafter described, illustrated in one of its embodiments in the accompanying drawings, and particularly pointed out in the appended claims.

Figure 1:
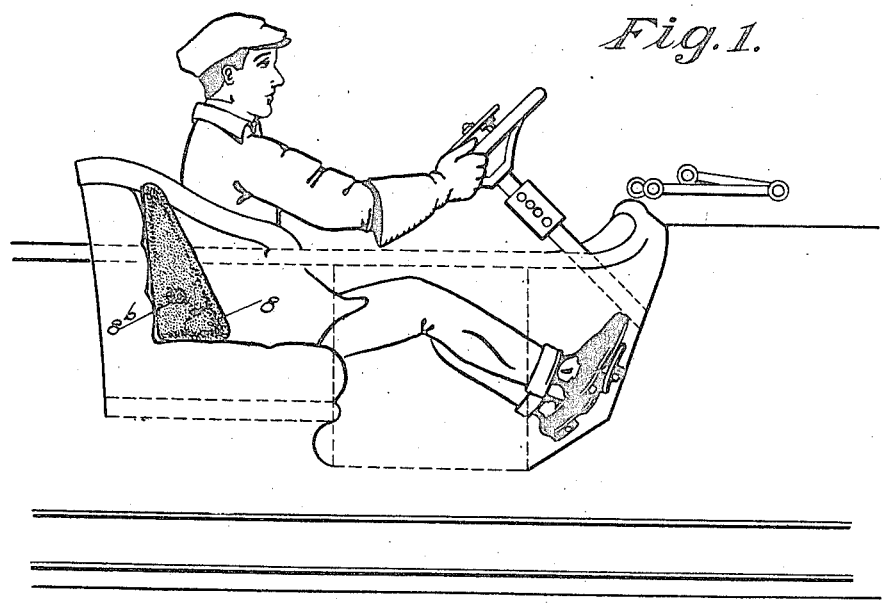

Referring to the drawings, forming a part of this specification, Figure 1, is a side elevation of the improved auxiliary or supplemental seat-back in its operative position as applied to the front or driver's seat of a motor vehicle.

Figure 2:
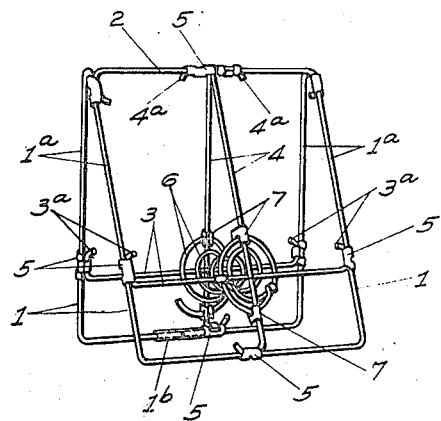

Fig. 2, a perspective view of the improved spring frame or structure removed from the cushioned covering.

Figure 3:
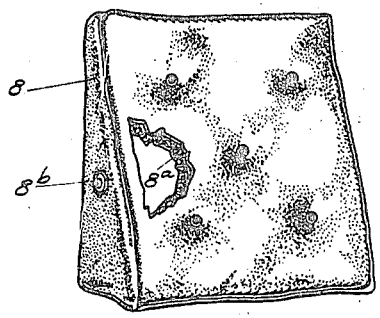

Fig. 3, a perspective view of the cushioned covering, a portion of the cushion being broken away for the purpose of clearer illustration of the parts.

Similar numerals of reference designate like parts throughout all the figures of the drawings.

The improved auxiliary seat-back comprises a rectangular frame or support, consisting, in the present instance, of a single length of wire bent upon itself forming rectangular base supporting loops 1, connected together by means of upwardly converging sides 1ª, forming wedge or inverted V-shaped sides, the pointed or apex portions of said sides 1ª, being connected and supported by means of an intermediate or cross supporting wire 2. The ends of the wire forming the converging sides 1ª, and the base supporting loops 1, may be connected in any suitable and convenient manner, as for example,—by means of a sleeve 1ᵇ, adapted to receive and contain the adjacent ends of the wire in one of the base supporting loops as shown.

As a means of cushioning and holding the base supporting loops 1, in spaced relation to each other, as well as reinforcing the latter and forming a suitable support for a suitable cushioning or spring element, the loops 1, are provided with suitable cross wires consisting, in the present instance, of transversely or horizontally extending wires 3, and vertically extending wires 4, and as a convenient means of attaching the bracing and supporting wires 3 and 4, to the sides 1ª, and 2, the ends of the wires or members 3 and 4 are preferably provided with bent-over portions 3ª and 4ª, the latter being connected, in the present instance, by means of suitable clamping clips 5, it being apparent, however, that the ends of the wire or brace members 3 and 4 may be secured in any other suitable convenient manner, as for example,—by electric welding, or the like.

The intersecting portions of the cross wires or members 3 and 4, are connected to a coiled spring 6, by means of suitable attaching and clamping clips 7, said spring 6, in the present instance, being of the "double helico-volute" type, and it will be apparent that such spring or cushioning element 6, will serve to cushion or resist the movements of the base supporting loops 1, toward each other when the improved auxiliary seat-back is in use.

As a means of providing a suitable inclosure or covering for the spring support or frame above described, a vented wedge or V-shaped covering 8, is provided, said covering 8, being preferably provided on one side with a suitable filling or cushioning material $8^a$, of a suitable thickness, the vent opening $8^b$, being adapted to permit the free flow of air into and out of the covering or inclosure as the loop portions of the frame are moved toward and from each other in coöperative relation to the spring 6, while the improved seat-back is in use.

From the foregoing description, taken in connection with the accompanying drawings, the operation and advantages of my invention will be readily understood.

Having thus described one of the embodiments of my invention, what I claim and desire to secure by Letters Patent, is,—

1. In an auxiliary seat-back, a rectangular frame bent upon itself intermediate its ends forming relatively movable base supporting loops and upwardly converging sides, and reinforcing spring connected members interposed between said loops.

2. In an auxiliary seat-back, a frame comprising a single length of wire forming V-shaped connected sides terminating in base supporting loops, cross wires arranged within said loops, and a coiled spring interposed between and connected to the intersecting portions of said cross wires.

3. An auxiliary seat-back, comprising a single length of wire bent upon itself forming V-shaped sides terminating in base supporting loops, cross wires arranged within and connected to the base portions of the latter, a coiled spring interposed between and connected to the intersecting portions of said cross wires to cushion said base supporting loops.

In testimony whereof I have affixed my signature in presence of two witnesses.

MAYO A. BOBRICK.

Witnesses:
O. C. BILLMAN,
M. M. GOODWIN.